United States Patent
Perentes et al.

(10) Patent No.: US 9,095,236 B2
(45) Date of Patent: Aug. 4, 2015

(54) LIQUID FOOD PREPARATION SYSTEM FOR PREPARING A LIQUID FOOD BY CENTRIFUGATION

(75) Inventors: Alexandre Perentes, Lausanne (CH); Christian Jarisch, Lutry (CH); Alfred Yoakim, St-Leigier-La Chiesaz (CH); Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 123 days.

(21) Appl. No.: 13/133,613

(22) PCT Filed: Dec. 8, 2009

(86) PCT No.: PCT/EP2009/066636
§ 371 (c)(1),
(2), (4) Date: Jun. 8, 2011

(87) PCT Pub. No.: WO2010/066736
PCT Pub. Date: Jun. 17, 2010

(65) Prior Publication Data
US 2011/0244099 A1 Oct. 6, 2011

(30) Foreign Application Priority Data
Dec. 9, 2008 (EP) .................................... 08171073

(51) Int. Cl.
*A47J 31/22* (2006.01)
*A47J 31/36* (2006.01)

(52) U.S. Cl.
CPC .............. *A47J 31/22* (2013.01); *A47J 31/3695* (2013.01)

(58) Field of Classification Search
CPC .... A47J 31/22; A47J 31/0673; A47J 31/3695
USPC ............ 426/431, 590; 99/302, 307, 316, 289, 99/302 C, 289 R
See application file for complete search history.

(56) References Cited

U.S. PATENT DOCUMENTS

| 239,659 | A | 4/1881 | Houston |
| 1,963,426 | A | 6/1934 | Taylor ............................. 97/233 |

(Continued)

FOREIGN PATENT DOCUMENTS

| AT | 197553 B | 5/1958 |
| BE | 894 031 A1 | 2/1983 |

(Continued)

OTHER PUBLICATIONS

Non Final Office Action, U.S. Appl. No. 12/776,155, dated Jul. 18, 2012.

(Continued)

*Primary Examiner* — Michael L Jacobson
*Assistant Examiner* — Tynesha McClain-Coleman
(74) *Attorney, Agent, or Firm* — Winston & Strawn LLP

(57) ABSTRACT

A system for preparing a liquid food from a food substance comprising a device and a capsule removably insertable in the device, by passing water through the substance in the capsule. The device includes a water injection head for injecting water in the capsule and a capsule holder for holding the capsule in the device, a mechanism for centrifugally driving the capsule, and a perforating member configured relative to the capsule in the device to open outlets at the periphery of the capsule. The capsule includes a pierceable membrane, and the perforating member is suited to be engaged through the membrane for forming with the perforated membrane a filter for retaining solid particles in the capsule and orifices in the membrane for enabling the centrifuged liquid to leave the capsule.

16 Claims, 10 Drawing Sheets

(56) References Cited

U.S. PATENT DOCUMENTS

| | | | |
|---|---|---|---|
| 1,963,476 A | 6/1934 | Smith | 210/67 |
| 2,778,739 A | 1/1957 | Rodth | 99/171 |
| 2,899,886 A | 9/1959 | Renner et al. | |
| 2,952,202 A * | 9/1960 | Renner et al. | 99/289 R |
| 3,025,781 A | 3/1962 | Bossi | |
| 3,233,535 A | 2/1966 | Fowlie | |
| 3,269,298 A | 8/1966 | Grundmann | |
| 3,566,770 A | 3/1971 | Crossley | 99/289 |
| 3,654,852 A | 4/1972 | Rosan, Sr. | |
| 3,812,773 A | 5/1974 | Hultsch | 99/290 |
| 3,822,013 A | 7/1974 | Van Der Veken | 206/233 |
| 3,967,546 A | 7/1976 | Cailliot | 99/286 |
| 3,985,069 A | 10/1976 | Cavalluzzi | 99/295 |
| 4,136,202 A | 1/1979 | Favre | |
| 4,426,919 A | 1/1984 | Rhoten | 99/289 |
| 4,464,982 A | 8/1984 | Leuschner et al. | 99/287 |
| 4,473,002 A | 9/1984 | Leuschner et al. | 99/302 |
| 4,545,296 A | 10/1985 | Ben-Shmuel | 99/289 |
| 4,584,101 A | 4/1986 | Kataoka | 201/474 |
| 4,806,375 A | 2/1989 | Favre | 426/433 |
| 4,846,052 A | 7/1989 | Favre et al. | |
| 4,859,337 A | 8/1989 | Woltermann | 210/474 |
| 4,962,693 A | 10/1990 | Miwa et al. | 99/283 |
| 5,047,252 A | 9/1991 | Liu et al. | 426/79 |
| 5,265,517 A | 11/1993 | Gilbert | 99/280 |
| 5,300,308 A | 4/1994 | Louridas | 426/112 |
| 5,325,765 A | 7/1994 | Sylvan et al. | 99/295 |
| 5,343,799 A | 9/1994 | Fond | |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,656,311 A | 8/1997 | Fond | |
| 5,755,149 A | 5/1998 | Blanc et al. | 99/289 |
| 5,773,067 A | 6/1998 | Freychet et al. | 426/506 |
| 5,826,492 A * | 10/1998 | Fond et al. | 99/295 |
| 5,948,455 A | 9/1999 | Schaeffer et al. | 426/77 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 | 9/2004 | Green | 99/289 P |
| 6,849,285 B2 | 2/2005 | Masek et al. | |
| 6,854,378 B2 | 2/2005 | Jarisch et al. | |
| 7,017,775 B2 | 3/2006 | Zettle et al. | 220/781 |
| 7,153,530 B2 | 12/2006 | Masek et al. | |
| 7,216,582 B2 | 5/2007 | Yoakim et al. | 99/295 |
| 7,325,478 B2 | 2/2008 | Cautenet et al. | |
| 7,325,479 B2 | 2/2008 | Laigneau et al. | |
| 7,469,627 B2 | 12/2008 | Li | 99/286 |
| 7,569,242 B2 | 8/2009 | Barber et al. | |
| 7,569,243 B2 | 8/2009 | Yoakim et al. | |
| 7,770,512 B2 | 8/2010 | Albrecht | 99/295 |
| 7,981,451 B2 | 7/2011 | Ozanne | |
| 8,151,694 B2 | 4/2012 | Jacobs et al. | 9/302 R |
| 8,307,754 B2 | 11/2012 | Ternite et al. | |
| 8,327,754 B2 | 12/2012 | Kirschner et al. | |
| 8,409,646 B2 | 4/2013 | Yoakim et al. | |
| 8,431,175 B2 | 4/2013 | Yoakim et al. | |
| 8,512,784 B2 | 8/2013 | Denisart et al. | |
| 8,813,634 B2 | 8/2014 | Yoakim et al. | |
| 2003/0116029 A1 | 6/2003 | Kollep | |
| 2003/0145736 A1 | 8/2003 | Green | 99/280 |
| 2003/0159593 A1* | 8/2003 | Leutwyler | 99/348 |
| 2003/0189872 A1 | 10/2003 | Artman et al. | |
| 2004/0255790 A1 | 12/2004 | Green | |
| 2005/0150390 A1 | 7/2005 | Schifferle | 99/295 |
| 2005/0188854 A1 | 9/2005 | Green et al. | |
| 2006/0003075 A1* | 1/2006 | Meador | 426/590 |
| 2006/0110507 A1 | 5/2006 | Yoakim et al. | 426/433 |
| 2006/0196364 A1 | 9/2006 | Kirschner | |
| 2006/0236871 A1 | 10/2006 | Ternite et al. | 99/295 |
| 2007/0079708 A1 | 4/2007 | Li | 99/279 |
| 2007/0248734 A1* | 10/2007 | Denisart et al. | 426/569 |
| 2007/0289453 A1 | 12/2007 | Halliday et al. | |
| 2008/0014860 A1 | 1/2008 | Heitman et al. | |
| 2008/0122286 A1 | 5/2008 | Brock et al. | |
| 2008/0187638 A1 | 8/2008 | Hansen | |
| 2009/0032454 A1 | 2/2009 | Rapparini | 210/337 |
| 2009/0050540 A1 | 2/2009 | Imai et al. | |
| 2009/0136639 A1 | 5/2009 | Doglioni Majer | 426/431 |
| 2009/0155422 A1 | 6/2009 | Ozanne | 426/89 |
| 2009/0218877 A1 | 9/2009 | Derman | |
| 2010/0024658 A1* | 2/2010 | Jacobs et al. | 99/302 R |
| 2010/0064899 A1 | 3/2010 | Aardenburg | 99/295 |
| 2010/0108541 A1 | 5/2010 | Roberto | |
| 2010/0173056 A1 | 7/2010 | Yoakim et al. | 426/433 |
| 2010/0176004 A1 | 7/2010 | Schneider et al. | 205/687 |
| 2010/0178392 A1 | 7/2010 | Yoakim et al. | 426/80 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0203208 A1 | 8/2010 | Yoakim et al. | 426/431 |
| 2010/0239734 A1 | 9/2010 | Yoakim et al. | 426/433 |
| 2011/0041702 A1 | 2/2011 | Yoakim et al. | 99/302 R |
| 2011/0052761 A1 | 3/2011 | Yoakim et al. | 426/77 |
| 2011/0189362 A1 | 8/2011 | Denisart et al. | 426/433 |
| 2011/0217421 A1 | 9/2011 | Perentes et al. | 426/80 |
| 2011/0244099 A1 | 10/2011 | Perentes et al. | 426/431 |
| 2011/0262601 A1 | 10/2011 | Manser et al. | |
| 2012/0058226 A1 | 3/2012 | Winkler et al. | |

FOREIGN PATENT DOCUMENTS

| | | |
|---|---|---|
| CA | 2625215 A1 | 4/2007 |
| CN | 101001555 A | 5/1995 |
| CN | 1656983 | 8/2005 |
| DE | 2151920 A1 | 4/1973 |
| DE | 32 41 606 A1 | 3/1984 |
| DE | 35 29 053 A1 | 2/1987 |
| DE | 35 29 204 A1 | 2/1987 |
| DE | 37 19 962 C1 | 6/1988 |
| DE | 42 40 429 A1 | 6/1994 |
| DE | 44 39 252 A1 | 5/1996 |
| DE | 10355671 A1 | 6/2004 |
| DE | 10 2005 007 852 A1 | 8/2006 |
| EP | 0242556 A1 | 10/1987 |
| EP | 0 250 810 A1 | 1/1988 |
| EP | 0 367 600 A1 | 5/1990 |
| EP | 0 512 470 A1 | 11/1992 |
| EP | 0 521 187 A1 | 1/1993 |
| EP | 0 607 759 A1 | 7/1994 |
| EP | 0 651 963 A1 | 5/1995 |
| EP | 0 749 713 A1 | 12/1996 |
| EP | 0 806 373 A1 | 11/1997 |
| EP | 1 208 782 A1 | 5/2002 |
| EP | 1 299 022 B1 | 4/2003 |
| EP | 1 654 966 A1 | 5/2006 |
| EP | 1 774 878 A1 | 4/2007 |
| EP | 0521510 A1 | 4/2007 |
| EP | 1 813 333 A2 | 8/2007 |
| EP | 2 000 062 A1 | 12/2008 |
| EP | 2155021 B1 | 3/2011 |
| FR | 2 132 310 A1 | 11/1972 |
| FR | 2 487 661 A1 | 2/1982 |
| FR | 2 513 106 A1 | 3/1983 |
| FR | 2 531 849 A1 | 2/1984 |
| FR | 2 535 597 A1 | 5/1984 |
| FR | 2617389 A1 | 1/1989 |
| FR | 2 624 364 A1 | 6/1989 |
| FR | 2 685 186 A1 | 6/1993 |
| FR | 2 686 007 A1 | 7/1993 |
| FR | 2 726 988 A1 | 5/1996 |
| GB | 1 506 074 A | 4/1978 |
| GB | 2 227 405 A | 8/1990 |
| GB | 2 253 336 A | 9/1992 |
| GB | 2 416 480 A | 2/2006 |
| JP | 50016225 A | 2/1975 |
| JP | 62254719 A | 11/1987 |
| JP | 63034581 U | 3/1988 |
| JP | 02124111 A2 | 5/1990 |
| JP | 02189114 A2 | 7/1990 |
| JP | 61-04091 B | 12/1994 |
| JP | 06339431 A2 | 12/1994 |
| JP | 59-082817 A | 5/1995 |
| JP | 3034606 | 2/1997 |

(56) References Cited

FOREIGN PATENT DOCUMENTS

| | | | |
|---|---|---|---|
| JP | 2001061663 | A2 | 3/2001 |
| JP | 2002189115 | A | 7/2002 |
| JP | 2002215414 | A | 8/2002 |
| JP | 2003144973 | A2 | 5/2003 |
| JP | 2004517654 | A | 6/2004 |
| JP | 2005516602 | | 6/2005 |
| JP | 2005199071 | A2 | 7/2005 |
| JP | 2005525146 | A | 8/2005 |
| JP | 2006515764 | A | 6/2006 |
| JP | 2006518226 | A | 8/2006 |
| JP | 2008508041 | A | 3/2008 |
| JP | 2008520298 | A | 6/2008 |
| TW | 200718383 | | 5/2007 |
| WO | WO 94/02059 | A1 | 2/1994 |
| WO | WO0217760 | | 3/2002 |
| WO | WO 02/35977 | A1 | 5/2002 |
| WO | WO2004/030500 | A1 | 4/2004 |
| WO | WO2005/066040 | A2 | 7/2005 |
| WO | WO 2006/082064 | A1 | 8/2006 |
| WO | WO 2006/112691 | A1 | 10/2006 |
| WO | WO2007/014584 | A1 | 2/2007 |
| WO | WO 2007/041954 | A1 | 4/2007 |
| WO | WO 2007/042414 | A1 | 4/2007 |
| WO | WO 2007/085921 | A2 | 8/2007 |
| WO | WO 2007/110768 | A2 | 10/2007 |
| WO | WO 2008/087099 | A2 | 7/2008 |
| WO | WO 2008/148601 | A1 | 12/2008 |
| WO | WO 2008/148604 | A1 | 12/2008 |
| WO | WO 2008/148646 | A1 | 12/2008 |
| WO | WO 2008/148650 | A1 | 12/2008 |
| WO | WO 2008/148656 | A1 | 12/2008 |
| WO | WO 2008/148834 | A1 | 12/2008 |
| WO | WO 2009/050540 | A1 | 4/2009 |
| WO | WO 2009/106175 | A1 | 9/2009 |
| WO | WO 2009/106598 | A1 | 9/2009 |
| WO | WO 2009/133134 | A1 | 11/2009 |
| WO | WO 2010/026045 | A1 | 3/2010 |
| WO | WO 2010/026053 | A1 | 3/2010 |
| WO | WO 2010/038213 | A2 | 4/2010 |
| WO | WO 2010/041179 | A2 | 4/2010 |

OTHER PUBLICATIONS

Final Office Action, U.S. Appl. No. 12/602,568, dated Jul. 16, 2012.
Final Office Action, U.S. Appl. No. 12/602,562, dated Jun. 22, 2012.
Final Office Action, U.S. Appl. No. 12/602,577, dated Jul. 20, 2012.
Final Office Action, U.S. Appl. No. 12/860,705, dated Jul. 18, 2012.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
Non Final Office Action, U.S. Appl. No. 12/602,577, dated Mar. 20, 2012.
Non Final Office Action, U.S. Appl. No. 12/602,562, dated Feb. 13, 2012.
Final Office Action, U.S. Appl. No. 12/602,562, dated Jun. 22, 2012.
Non Final Office Action, U.S. Appl. No. 12/602,542, dated Apr. 13, 2012.
Non Final Office Action, U.S. Appl. No. 12/602,730, dated May 17, 2012.
Non Final Office Action, U.S. Appl. No. 12/860,705, dated Mar. 16, 2012.
Restriction Requirement, U.S. Appl. No. 12/602,553 dated May 11, 2012.
Non Final Office Action, U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.

Non Final Office Action, U.S. Appl. No. 13/061,558, dated Dec. 6, 2012.
Final Office Action, U.S. Appl. No. 12/602,542, dated Oct. 4, 2012.
Final Office Action, U.S. Appl. No. 12/602,730, dated Sep. 18, 2012.
Non Final Office Action. U.S. Appl. No. 12/602,553, dated Aug. 23, 2012.
Non Final Office Action, U.S. Appl. No. 12/602,568, dated Jul. Oct. 19, 2012.
International Search Report mailed Feb. 4, 2010, Application No. PCT/EP2009/066636 filed Dec. 8, 2009.
International Search Report mailed Feb. 9, 2010, Application No. PCT/EP2009/060697 filed Aug. 19, 2009.
International Search Report mailed Feb. 8, 2010, Application No. PCT/EP2009/060771 filed Aug. 20, 2009.
International Search Report and Written Opinion mailed Sep. 11, 2008, Application No. PCT/EP2008/054401 filed Apr. 11, 2008.
International Search Report and Written Opinion mailed Oct. 24, 2008, Application No. PCT/EP2008/054810 filed Apr. 21, 2008.
International Search Report and Written Opinion mailed Oct. 8, 2008, Application No. PCT/EP2008/056310 filed May 22, 2008.
International Search Report and Written Opinion mailed Oct. 1, 2008, Application No. PCT/EP2008/056345 filed May 23, 2008.
International Search Report and Written Opinion mailed Sep. 11, 2008, Application No. PCT/EP2008/056412 filed May 26, 2008.
International Search Report and Written Opinion mailed Oct. 7, 2008, Application No. PCT/EP2008/056968 filed Jun. 5, 2008.
European Search Report dated Apr. 9, 2010, Application No. EP 09174573.
U.S. Appl. No. 12/602,542, filed Dec. 1, 2009.
U.S. Appl. No. 12/602,568, filed Dec. 1, 2009.
U.S. Appl. No. 12/602,562, filed Dec. 1, 2009.
U.S. Appl. No. 12/602,553, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 12/856,369, filed Aug. 13, 2010.
U.S. Appl. No. 12/860,705, filed Aug. 20, 2010.
U.S. Appl. No. 13/061,567, filed Mar. 1, 2011.
U.S. Appl. No. 13/061,558, filed Mar. 1, 2011.
Non-Final Office Action, U.S. Appl. No. 13/602,542 dated Jun. 18, 2013.
Restriction Requirement, U.S. Appl. No. 12/856,369 dated Feb. 15, 2013.
Notice of Allowance U.S. Appl. No. 12/776,155 dated Mar. 1, 2013.
Notice of Allowance, U.S. Appl. No. 12/602,568 dated Feb. 1, 2013.
Advisory Action, U.S. Appl. No. 12/602,577 dated Oct. 11, 2012.
Non-Final Office Action, U.S. Appl. No. 13/061,567 dated May 10, 2013.
Advisory Action, U.S. Appl. No. 12/602,730 dated Jan. 18, 2013.
Final Office Action, U.S. Appl. No. 13/061,558 dated May 21, 2013.
Notice of Allowance, U.S. Appl. No. 13/061,567 dated Jun. 11, 2013.
Final Office Action, U.S. Appl. No. 13/603,553 dated Apr. 11, 2013.
Non-Final Office Action, U.S. Appl. No. 12/856,369, Jul. 30, 2013.
Non Final Office Action, U.S. Appl. No. 12/602,577 dated Nov. 1, 2013.
Non-Final Office Action, U.S. Appl. No. 12/602,730 dated Dec. 17, 2013.
Notice of Allowance, U.S. Appl. No. 12/602,577, Nov. 14, 2014.
Advisory Action, U.S. Appl. No. 12/602,553, Jul. 23, 2013.
Restriction Requirement U.S. Appl. No. 12/602,562, Dec. 23, 2011.
Advisory Action, U.S. Appl. No. 12/602,562, Sep. 25, 2012.
Advisory Action, U.S. Appl. No. 12/602,568, Sep. 27, 2012.
Notice of Allowance, U.S. Appl. No. 12/602,730, Apr. 29, 2014.
Restriction Requirement, U.S. Appl. No. 12/776,155, Apr. 30, 2012.
Final Office Action, U.S. Appl. No. 12/856,369, Mar. 10, 2014.
Advisory Action, U.S. Appl. No. 12/856,369, May 9, 2014.
Restriction Requirement, U.S. Appl. No. 12/860,705, Dec. 30, 2011.
Advisory Action, U.S. Appl. No. 12/860,705, Oct. 17, 2012.
Notice of Allowance, U.S. Appl. No. 12/860,705, Nov. 14, 2013.
Restriction Requirement, U.S. Appl. No. 13/061,558, Nov. 13, 2012.
Non-Final Office Action, U.S. Appl. No. 12/602,562, Jan. 13, 2015.
Non-Final Office Action, U.S. Appl. No. 12/602,553, Jan. 13, 2015.

(56) References Cited

OTHER PUBLICATIONS

Final Office Action, U.S. Appl. No. 12/860,705, Jul. 18, 2012.
Final Office Action, U.S. Appl. No. 12/602,562, Feb. 11, 2015.
U.S. Appl. No. 12/602,542, Final Office Action, dated Jan. 30, 2014.
U.S. Appl. No. 13/061,558 Non-Final Office Action, dated Feb. 14, 2014.
U.S. Appl. No. 12/602,562, Non-Final Office Action, dated Jul. 17, 2014.
U.S. Appl. No. 12/602,577, Non-Final Office Action, dated May 16, 2014.
U.S. Appl. No. 12/602,553, Final Office Action, dated May 8, 2014.
U.S. Appl. No. 13/061,558, Notice of Allowance, dated Sep. 26, 2014.

* cited by examiner

LIQUID FOOD PREPARATION SYSTEM FOR PREPARING A LIQUID FOOD BY CENTRIFUGATION

This application is a 371 filing of International Patent Application PCT/EP2009/066636 filed Dec. 8, 2009.

BACKGROUND

The present invention relates to a capsule system and a method for preparing a food liquid from a food substance contained in a receptacle by passing water through the substance using centrifugal forces.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed manually in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In German patent application DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053; FR2535597; WO2007/041954; DE3529204; DE3719962; FR2685186; DE3241606 and U.S. Pat. No. 4,545,296.

However, the effect of centrifugal forces to brew coffee or prepare other food substances presents many advantages compared to the normal brewing methods using pressure pumps. For example, in "espresso" coffee-type brewing methods, it is very difficult to master all the parameters which influence the quality of extraction of the delivered coffee extract. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new capsule system and a method adapted therefore for which the extraction parameters can be better and more independently controlled for controlling quality of the delivered food liquid.

At the same time, there is a need for a way of preparing a food liquid which is more convenient compared to the prior art centrifugal coffee preparation device, in particular a solution which does not require the hassle of removing coffee waste from the centrifuging receptacle.

SUMMARY OF THE INVENTION

Therefore, the present invention relates to a liquid food preparation system for preparing a liquid food from a food substance comprising a device and a capsule removably insertable in the device, by passing water through the substance in the capsule, comprising a water injection head for injecting water in the capsule and a capsule holder for holding the capsule in the device, means for driving the capsule in centrifugation,
perforating members which are configured relative to the capsule in the device to open outlets at the periphery of the capsule,
a capsule comprising a perforable delivery membrane,
wherein the perforating means, are suited to be engaged in perforation through the membrane for forming with the perforated membrane a filtering means for retaining solid particles in the capsule and orifices in the membrane for enabling the centrifuged liquid to leave the capsule.

The invention also relates to a method for preparing a food liquid from a food substance contained in a single-use capsule by passing liquid through the substance comprising:

driving the capsule in centrifugal rotation while introducing liquid in the centre of the capsule,
passing liquid through the substance by effect of centrifugation to form a centrifuged food liquid,
delivering the centrifuged food liquid from the capsule,
wherein it comprises perforating a membrane of the capsule by perforating means,
maintaining the perforating members in perforating engagement through the membrane during centrifugation to selectively filtrate the centrifuged liquid leaving the capsule from the solid particles contained in the capsule.

The term "solid particles" means the solid particles of the substance contained in the capsule which are substantially insoluble in the liquid and/or partly or totally depleted of their soluble compounds or are entirely soluble but still in a solid state in the capsule before the end of the preparation of the beverage.

According to a surprising effect of the invention, the capsule can have no filter placed inside its internal volume to prevent solid particles from leaving the capsule.

Therefore, the filtering means can be formed by the orifices provided between the perforating member in engagement through the membrane and the edges of the perforations provided in the membrane.

Due to the centrifugal effect, the solid particles remaining in the capsule can form a compact mass of solid particles at the periphery of the capsule therefore avoiding a substantial amount of loose particles to pass through the orifices created in the membrane. Furthermore, the size of the orifices can be controlled to ensure an efficient filtering effect at the interface between the perforating means and the membrane.

According to another aspect, the device comprises a rotary plate and the perforating means comprises a multitude of, preferably sharp, projections extending from the surface of the rotary cover plate in the capsule when the capsule is inserted in the device.

More preferably, each individual projection has a section that sharpens progressively from a larger base to at least one or more perforating tip(s) of the projection and the projection comprising at least two cutting surfaces delimited by at least one edge line. This profile of the projection ensures both a reliable perforation of the membrane and a control of the size of the orifices. In particular, a controlled tearing of the membrane can occur at the edge line thereby forming an orifice of repeatable size.

The number of projections should be sufficient to perform a consistent flow of the beverage outside the capsule. More preferably, the device comprises at least ten sharp projections or more which are distributed along a peripheral area of the membrane when the capsule is inserted in the device. Most preferably, the number of projections is comprised between 10 and 100, most preferably between 20 and 50.

The perforating means can comprise sharp projections suitable for forming individual perforations in the membrane having a cross-section that is larger than the cross-section of the said projections at the base of the perforations when the projections are engaged in perforation with the membrane. More particularly, each individual perforating projection has a wider cross section forming at least one concave line in transversal cut view of the section. Thus, this ensures that at least one orifice can be defined between the projections and the membrane can be obtained, as the result of the perforation made through the membrane. In a preferred mode, each individual perforating projection has substantially triangular and/or trapezoidal cutting surfaces. In one mode, the perforating element has two apices formed from triangular and trapezoidal surfaces joining each other from base at edge lines.

Each individual perforating projection has preferably a polygonal cross section with at least two segments intersecting inward the polygon (i.e., hence the two segments forming a concave line). For instance, the cross section can resemble a letter chosen amongst a C, M, S, T, V, X, W, Y, Σ, Z and combinations thereof. Of course, other various shapes are possible provided that a concave line can be formed, as defined above, so that a perforation larger than the section of the projection is provided through the membrane allowing at least one orifice to be left for the discharged liquid.

In another aspect of the beverage production system, a flow restriction valve can be placed downstream of the perforating means. Preferably, the flow restriction valve opens as a result of the pressure exerted by the centrifuged liquid out of the capsule. The flow restriction valve thereby enables to maintain a minimal pressure level in the capsule by forcing the liquid pressure to rise upstream of the valve. Due to the valve, the centrifuged liquid is maintained longer in contact with the food ingredients and the quality of extraction can be greatly improved. The valve also enables to regulate the flow rate of the discharged liquid by a selection of the rotational speed of the drive means.

Furthermore, the flow restriction valve can comprise an annular, preferably continuous, ring applying a closing pressure onto the capsule.

In one possible mode, the annular ring is formed on the rotary cover plate. The peripheral edge of the capsule can form a flange-like rim onto which the annular ring provides a closing pressure.

In another mode, the annular ring is formed on the capsule. In particular, the capsule comprises a flange-like rim with an annular projection forming at least one closing barrier of the valve means. The annular projection can have an inverted U-like or V-like shape protruding from a substantially flat annular rim. The annular projection has preferably a thickness comprised between 0.3 and 3.0 mm, most preferably between 0.45 and 1 mm. In a more specific non-limiting mode, the projection is formed by an embossment in the flange-like rim, i.e., an annular indentation at the lower side of the flange-like rim and an annular projection at the upper side of the flange-like rim. The projection can be formed by embossing such as during the deep drawing operation of the capsule's body when the capsule is produced.

According to a particular mode of the capsule, the capsule comprises a cup-shaped body with a sidewall widening in the direction of the membrane. The widening of the side wall promotes the flow of the centrifuged liquid toward the outlets of the capsule. In a preferred mode, the widening side wall forms an angle between 50 and 80 degrees, more preferably of about 60+/−5 degrees relative to the plane of the membrane. Preferably, the sidewall forms a trunk of cone.

In another aspect, the device comprises a water injector arranged for introducing liquid in the capsule. In particular, the water injector can be a hollow needle. The water injector is preferably located along the rotational centreline of the capsule. In such a configuration, the membrane of the capsule can be perforated by the water injector for introducing a portion of the injector and injecting liquid in the capsule.

The capsule can comprise a substance which is extractable or dissolved in a liquid, e.g., ground coffee or soluble, e.g., milk powder. In particular the substance can be chosen amongst ground coffee, instant coffee, chocolate, cocoa powder, leaf tea, instant tea, herbal tea, a creamer/whitener, a nutritional composition (e.g., infant formula), dehydrated fruit or plant, culinary powder and combinations thereof.

The invention may also comprise the device as taken independently with the above-described features.

The invention also relates to a liquid food preparation device for preparing a liquid food from a food substance contained in a capsule removably insertable in the device, by passing water through the substance in the capsule, said device comprising a water injection head for injecting water in the capsule and a capsule holder for holding the capsule in the device, means for driving the capsule in centrifugation, perforating means which are configured relative to the capsule in the device to open outlets at the periphery of the capsule, wherein said perforating means comprises perforating members of different heights.

The problem solves by the present device is essentially to enable to perforate the capsule, e.g., a membrane of it, by a sufficient number of individual perforations to provide a sufficient flow rate of liquid or beverage leaving the capsule while diminishing the perforating force. Indeed, a problem is that too many perforating members provide a "fakir" effect that renders the head too difficult to close against the capsule. As a result, the capsule, e.g., top membrane, is not correctly perforated. By providing perforating members of different heights, the capsule is progressively perforated and the closure force is reduced accordingly.

More preferably, the perforating members have at least two different heights.

The perforation means preferably comprises a first array of first perforation members and a second array of second perforation members. The first and second arrays contributes to provide a sufficient opening in the capsule able to provide high beverage flow rate, e.g., about 5 mL per seconds or more.

The first array of perforation members and second array of perforation members are offset relative to each other in the radial direction. Again, this particular distribution contributes to facilitate the flow of centrifuged beverage coming out of the capsule.

In the preferred mode, the first and second perforation members protrude from the upper surface of a rotary part of the head in the periphery of said part. The rotary part is further preferably made of a first innermost part and a second outermost part, wherein said innermost part comprises the perforation means and the outermost part comprises annular spring-biased closing ring. The advantage is here that perforation forces is made independent from the restriction forces created downstream of the capsule. As a result, the restriction created by the valve means is better controlled and is not perturbed by the closure forces of the perforating means on the capsule. Also, the perforating means remain in place whatever the position (e.g., open or closed) of the valve means during the centrifugal brewing operation.

In general, the perforation members can also be truncated cones or pyramids.

The perforating members can also have a polygonal base such as pentagonal, hexagonal or octagonal. The perforating member may also have a cruciform perforating shape.

In order to facilitate perforation of the capsule, the perforating member can form an asymmetrical profile wherein their cutting edges form an angle or a line of curvature which is not the same on at least one surface of the member.

In addition, for security reasons, the perforating members can be retractable in the injection head to be hidden by a shielding wall when the head is open.

BRIEF DESCRIPTION OF THE DRAWINGS

Additional features of the invention will appear in the detailed description of the figures which follows.

DETAILED DESCRIPTION OF THE INVENTION

Figure 1:
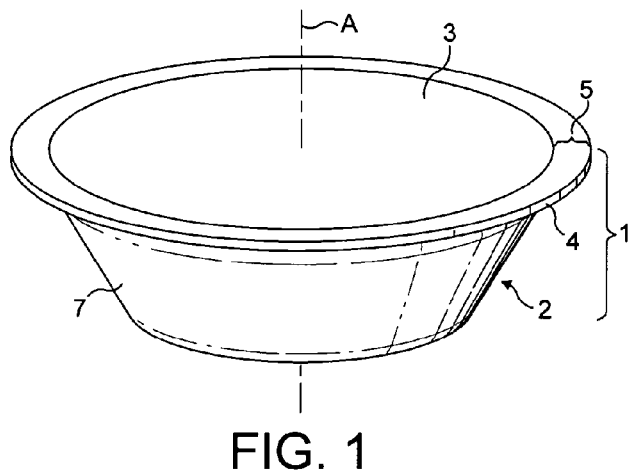
FIG. 1 is a top perspective view of a sealed capsule of the system according to the invention.
Figure 2:
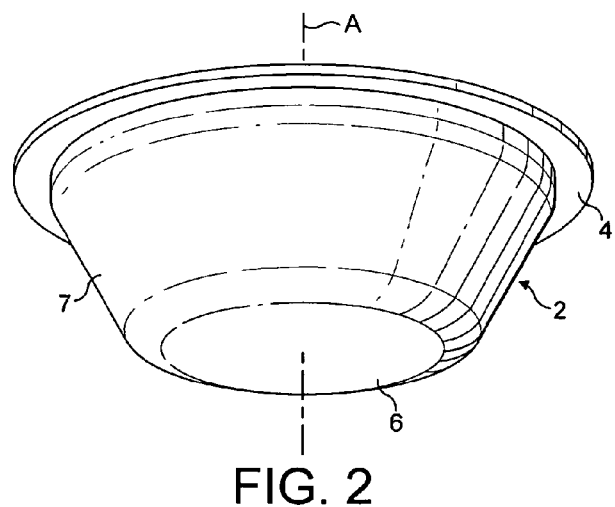
FIG. 2 is a bottom perspective view of the capsule of FIG. 1.

As shown in FIGS. 1 and 2, a preferred single-use capsule 1 of the invention generally comprises a dished body 2 onto which is sealed a perforable membrane 3. The membrane 3 is sealed onto a peripheral rim 4 of the body at a sealing annular portion 5. The rim 4 can extend outwards forming an annular sealing small portion of between about 2-5 mm. The dished body comprises a bottom wall 6 and a side wall 7 which preferably widens in direction of the large open end of the body opposed to the bottom wall. The dished body is preferably rigid or semi-rigid. It can be formed of a food grade plastic, e.g., polypropylene, with a gas barrier layer such as EVOH and the like or aluminium alloy or a laminate of plastic and aluminium alloy. The membrane 3 can be made of a thinner material such as a plastic film also including a barrier layer or aluminium alloy or a combination of plastic and aluminium alloy. The membrane is usually of a thickness between 20 and 250 microns, for example. The sealing foil member is perforated for creating the water inlet and the beverage outlet(s) as will be described later in the description.

Preferably, the capsule forms a symmetry of revolution around a central axis A. However, it should be noted that the capsule may not necessarily have a circular section around axis A but may take another form such as a square, a rectangle, or another polygonal form.

A first embodiment of a system including a capsule of the invention and a beverage preparation device is illustrated in FIGS. 3 to 6 and is described now.

The system comprises a capsule 1 as aforementioned and a beverage preparation device 23. The device has a module 24 which a capsule can be inserted in. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir. Alternatively, the water heater can be placed in the water reservoir itself that becomes a water boiler in such case. Of course, water can also be taken directly from a domestic water supply via a water plug connection. The device may further comprise control means and activation means for activating the beverage preparation method (not illustrated).

Water can be fed in the module 24 at low pressure or even at gravity pressure. For example, a pressure of between 0 and 2 bar above atmospheric pressure can be envisaged at the water inlet of the module. Water at higher pressure than 2 bar could also be delivered if a pressure pump is utilized such as a piston pump.

The brewing module 24 can comprise two main capsule encasing sub-assemblies 29, 30; mainly comprising a water injection sub-assembly or water injection head and a liquid receiving subassembly including a capsule holder.

The two subassemblies form positioning and centring means for referencing the capsule in rotation in the device.

Figure 3:
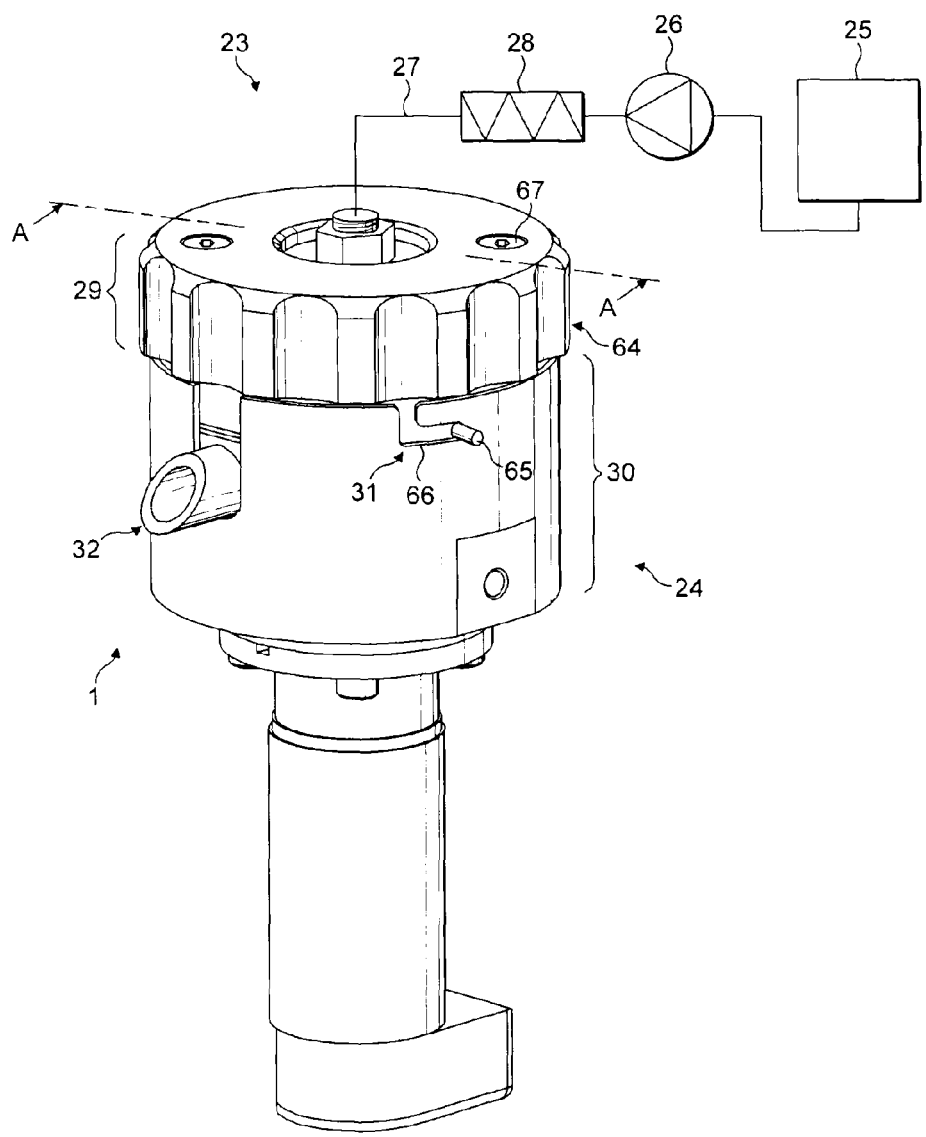
FIG. 3 is a perspective view of the beverage production device of the invention.
Figure 4:
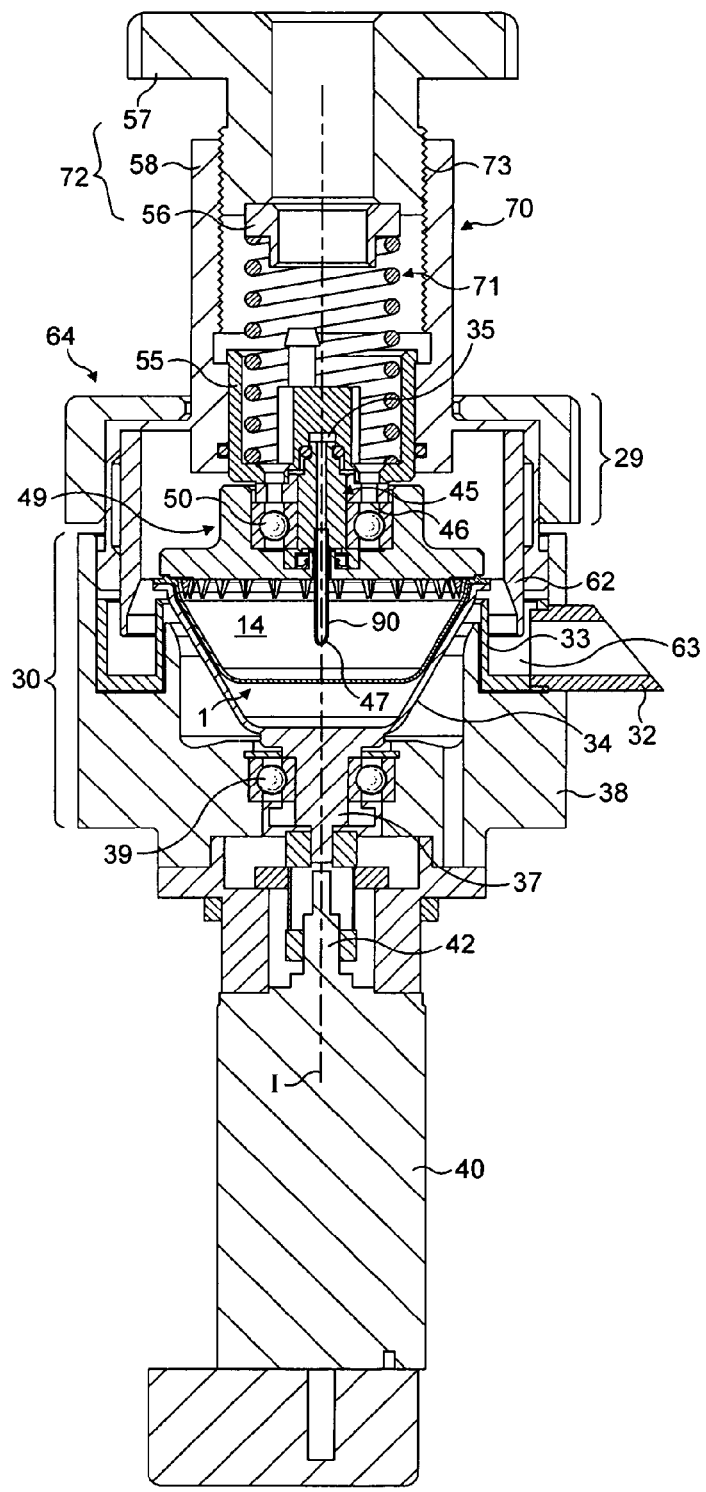
FIG. 4 is a cross sectional view of a beverage production device with a capsule inside.

The two subassemblies' closes together to encase a capsule therein for example by a bayonet-type connection system 31 or a any other suitable closure means such as jaw-type closure principle. As shown in FIG. 3, a bayonet-type connection system 31 may include small pins 65 on the side of the tubular surface of subassembly 29 which can engage side locking openings 66 on the tubular surface of subassembly 30. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a U-like or V-like shaped annular section surrounding a capsule holder formed by a rotating drum 34 into which the capsule is inserted as illustrated in FIG. 4. The liquid receiver 33 defines an annular chamber 63, which serves as a collecting cavity for collecting the liquid as will be explained later in the description. Below the liquid receiving subassembly 30, are placed means for driving the capsule receiving drum 34 in rotation inside the subassembly.

The driving means comprise preferably a rotary motor 40 which can be supplied by electricity or gas power.

The water injection subassembly comprises a water inlet side comprising a water inlet 35 communicating upstream with the water fluid circuit 27.

The rotary drum 34 is shaped as a hollow capsule holder with an internal cavity 36 complementary shaped to receive the capsule. The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. A mechanical coupling can be placed at the interface between the rotating shaft 37 of the drum and the shaft 42 of the motor 40.

Considering the water injection subassembly 29, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The central tubular member extends by a hollow needle 90 for intruding in the capsule and injecting liquid therein. For this, the water outlet is associated by a puncturing means such as a sharp tubular tip 48 that is able to create a punctured hole through the membrane lid 3 of the capsule.

About the water injector is mounted a rotary engaging part or cover part 49. The engaging part 49 has a central bore for receiving the water injector and rotational guiding means such as a ball or needle bearing 50 inserted between the part 49 and the injector 45. A sealing means 89 is positioned between the ball bearing 50 and the injection needle 90 for preventing ingress of liquid from the capsule inside the bearing.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid which exits the centrifuged capsule.

This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

According to an important aspect of the invention, the rotary engaging part comprises perforating members 53 located at the periphery of the part. The perforating members are placed for perforating the membrane 3 of the capsule at its periphery, more particularly, in an annular peripheral region of the top membrane 3 of the capsule. More particularly, the perforating members are formed of sharp projections protruding from the lower surface of the engaging part. The membrane is preferably perforated when the water injection subassembly 29 is moved relative to the capsule, when the capsule is in place in the drum 34 of the lower subassembly 30, during closure of the device, i.e., of the two sub-assemblies 29, 30, about the capsule.

The perforating elements are preferably distributed along a circular path of the part.

In a preferred mode, the perforating members 53 are solid (i.e., not traversed by a liquid supply conduit) at the tip.

A valve means 51 can be provided in the system in the flow path of the centrifuged liquid downstream of the perforating elements. The valve means can be any suitable valve providing opening or enlargement of the flow path when a given threshold of pressure is attained. The valve means is so calibrated to open at a given pressure. For instance, the opening pressure is of about 1.5 to 4 bar, preferably of about 2 bar, of pressure.

Figure 5:
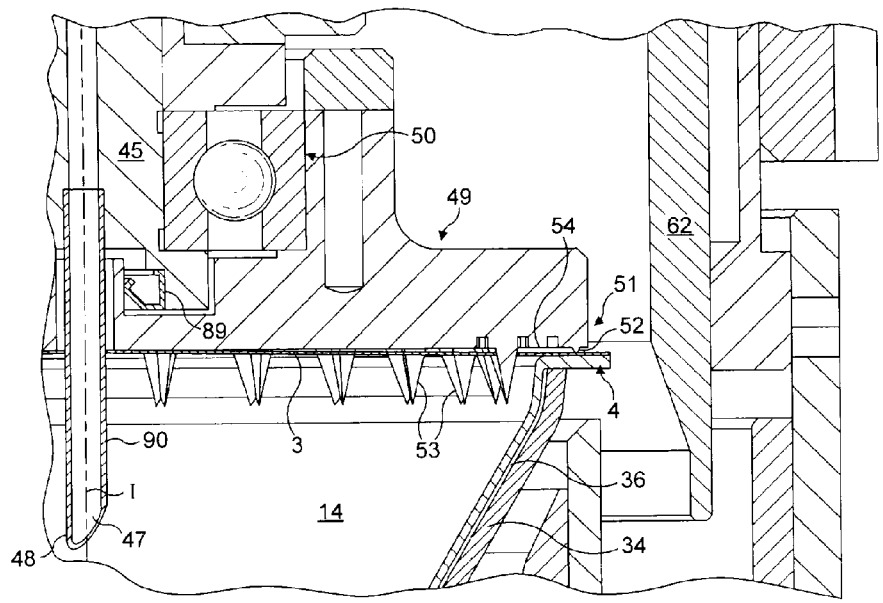
FIG. 5 is a detailed cross sectional view of the view of FIG. 4.
Figure 6:
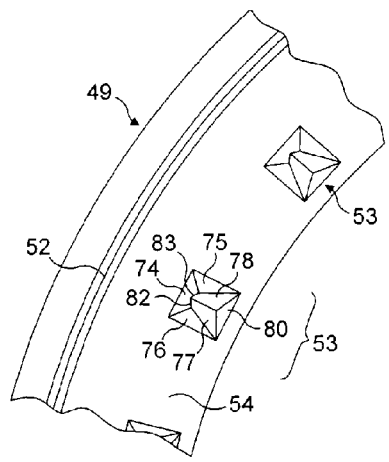
FIG. 6 is a detailed bottom view of a detail of the beverage production device.
Figure 7:
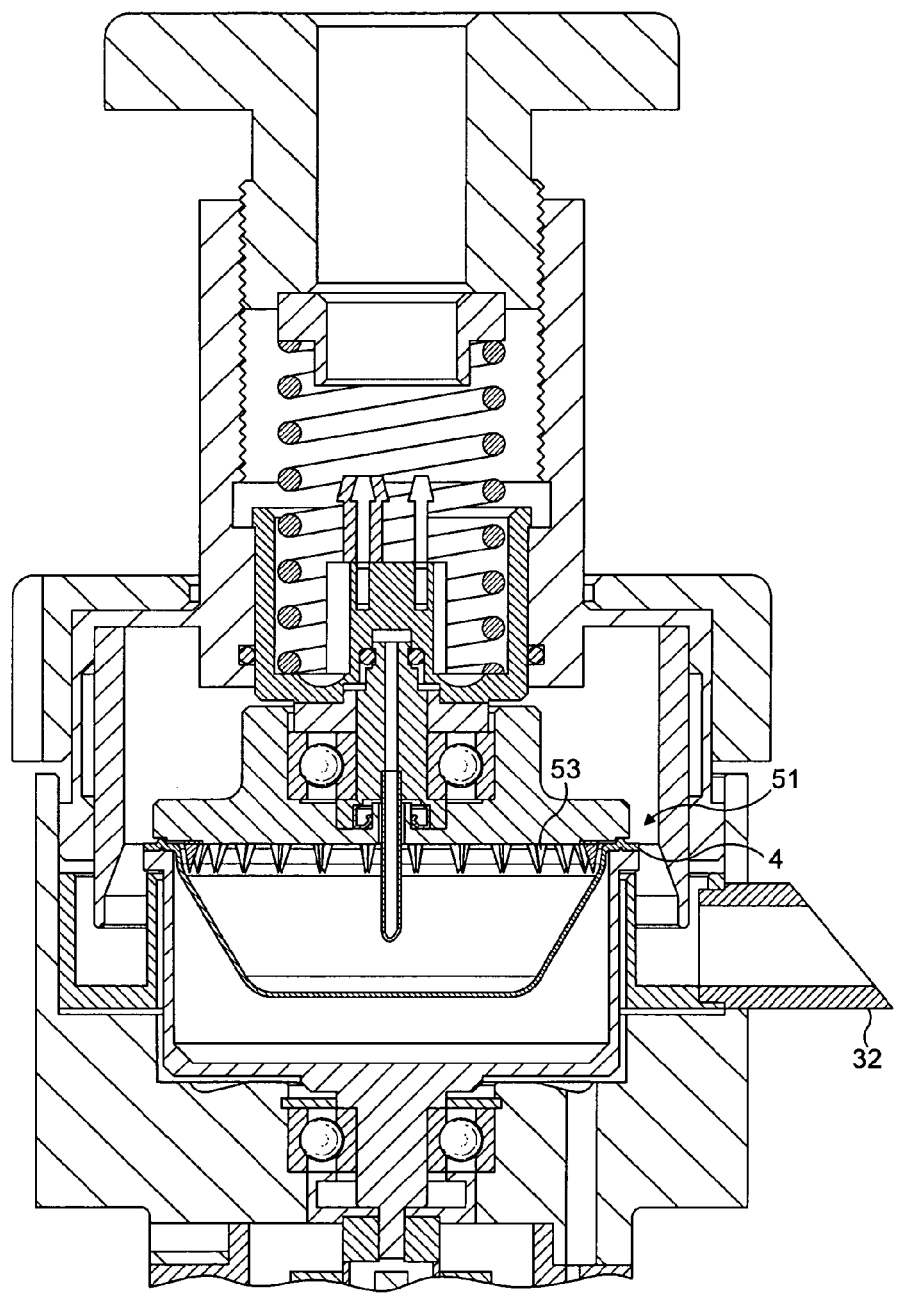
FIG. 7 is a perspective view of the beverage production system of the invention including a variant of capsule.
Figure 8:
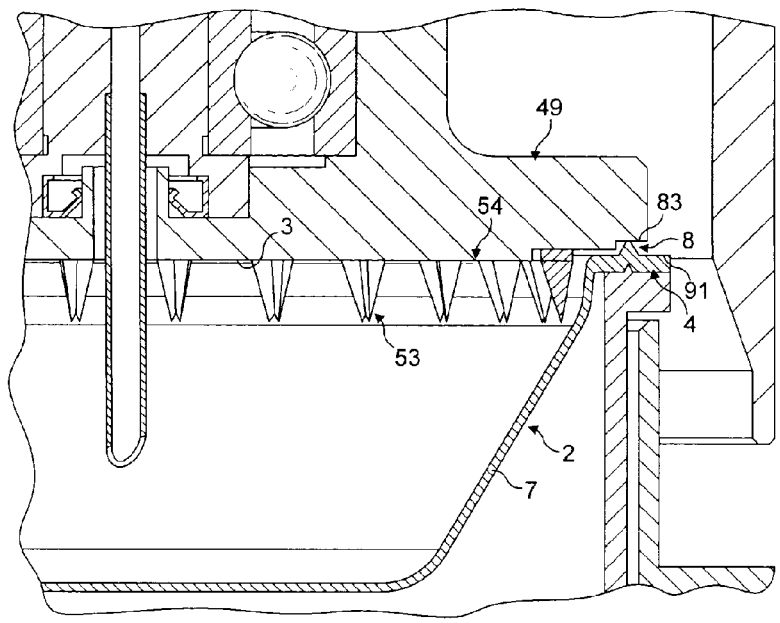
FIG. 8 is an enlarged view of the beverage production system of FIG. 7.

The valve means can take very various forms such as a spring-biased closure ring or an elastomeric valve, e.g., a silicone septum. In the preferred mode, as illustrated in FIGS. 5 and 6, the valve means comprises a ring-shaped protrusion 52 which is part of the rotary engaging cover part 49. The protrusion extends as an annular ring at the periphery of the part 49. The protrusion applies a closure load onto the flange-like rim 4 of the capsule. The closure load is obtained by a load generating system 70 comprising a spring-biasing element 71. The spring-biasing element 71 applies a resilient load onto the rotary cover plate 49. The load primarily distributes itself onto the tip of the ring-shaped protrusion 52 acting in closure against the flange-like rim 4 of the capsule. Therefore, the valve normally closes the flow path for the centrifuged liquid until a sufficient pressure is exerted on the protrusion by the centrifuged liquid exiting through the orifices created by the perforating elements. The liquid flows thus between the membrane 3 and the upper surface 54 of the rotary cover part 49 and forces the valve 51 to open by pushing the whole cover part upwards against the force of the spring-biasing element 71. The centrifuged liquid can thus be ejected at a high velocity on the impact surface, which is the tubular portion of skirt 62.

The load generating system 70 can be made adjustable as illustrated in FIG. 4 for controlling the opening pressure of the valve means. In particular, the system 70 can comprises a base 55 into which is fitted a first end of the spring-biasing element 71. At the opposed end of the spring-biasing element 71 is fixed, an abutting member 56 further connected to a screw element 57. The base 55, element 71 and abutting member 56 are housed into a tubular frame 58. The screw element 57 and tubular frame 58 form together an actuating means 72 comprising a complementary thread 73 enabling to tune the compressive load of the spring-biasing element 71 on the engaging part 49.

It should be noticed that the elastic means for exerting the load on the valve means can be designed differently. For instance, the elastic means, e.g., a spring or rubber-elastic element, can be directly associated to a ring-shaped protrusion of the valve means. In another mode, the protrusion itself is resilient and can be lodged, e.g., clipped or sealed, in a peripheral ring-shaped recess of the part 49 to form the valve means acting on the capsule.

FIG. 6 illustrates a possible design for the perforating projections 53 protruding from the cover part 49 of the beverage production device. The design of the perforating projections is such that it perforates a hole in the membrane that is of larger cross-section than the engaged section of the perforating element. As a result, this ensures that an orifice is defined for the liquid to leave the capsule when the element is in engagement in the membrane. In this particular configuration, the perforating element forms several cutting surfaces 74, 75, 76, 77, 78 forming a perforating three-dimensional polygon with two apices 82, 83. At least several surfaces, in particular, surfaces 77, 78 are such that they form a concave line in cross-section of the polygon. In the illustrated example, the surfaces 77, 78 form a triangular indentation directed inwards the polygon as defined by the triangular base 80 of the element. Of course, the surfaces 77, 78 could merge together or with the other surfaces 74-76 without forming a distinct edge line but rather a continuously rounded surface. For instance, surfaces 77, 78 can form a single rounded concave surface. Depending on the membrane material, the membrane tends to deform against the surfaces of the perforating element for closing more or less the perforated orifices.

The larger orifice that is especially created by the surfaces 77, 78 in the membrane allows gas to escape from the capsule, when the capsule is filled with liquid, i.e., hot water, by the injector. Therefore, the form of the perforating element also participates to the priming of the system during the beginning of extraction. As the membrane is flexible enough to match on the surfaces of the perforating element, the solid particles such as coffee particles, can be essentially retained inside the capsule 1. Therefore, the shape and dimensions of the cutting surfaces 74-78 of the perforating element, as well as the choice of the membrane for the capsule, can be selected to provide an optimal compromise on the flow restriction, the particle retention and gas venting effect. In particular, aluminium or an alloy of aluminium for the membrane provide remarkable results since it tears in a relatively reproducible manner. However, the membrane could also be polymer(s) or a combination of aluminium or its alloys and polymer(s). The membrane is preferably relatively thin in order to facilitate reliable perforations in the device, in particular with membranes made of soft polymer(s), and also to provide the relative restriction and retention effect. More preferably, the membrane has a thickness of less than 1.0 mm, most preferably, less than 200 microns.

FIGS. 7 to 10 refer to another possible embodiment of the beverage production system of the invention. For sake of simplicity and avoiding repetitions, the same numerical references as for the former embodiment are used for designating the same technical means. The essential difference lies in that the particular configuration of the valve means 51 placed downstream of the puncturing elements 53. The valve means comprises a portion of engagement 8 of the capsule which projects from the flange-like rim 4 of the capsule. This portion of engagement forms a projection extending upwards from the substantially flat surface 91 of the rim. The portion 8 can be formed integrally from the flange-like rim. In such case, the body 2 of the capsule including the flange-like rim is made of plastics and/or aluminium. On the opposed side, the valve means comprises an engaging surface 83 of the rotary cover part 49. The engaging surface may comprise various shapes depending on the particular shape of the projection 8. In a preferred mode, the engaging surface 83 is a substantially planar surface such as an annular flat surface. The engaging surface may be formed as an annular recessed portion of surface at the periphery of the lower surface 54 of the cover part 49 thereby allowing the base of perforating members to be lower than the base of the projection.

It should be noted that the engaging surface 83 may take many different shapes other than flat such as concave or convex.

Figure 10:
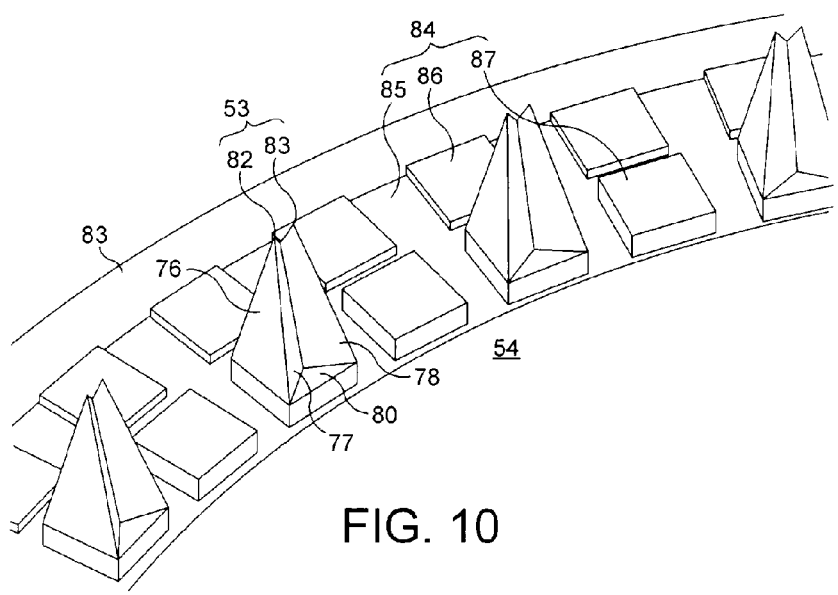
FIG. 10 is a detailed view of the part of FIG. 9.
Figure 9:
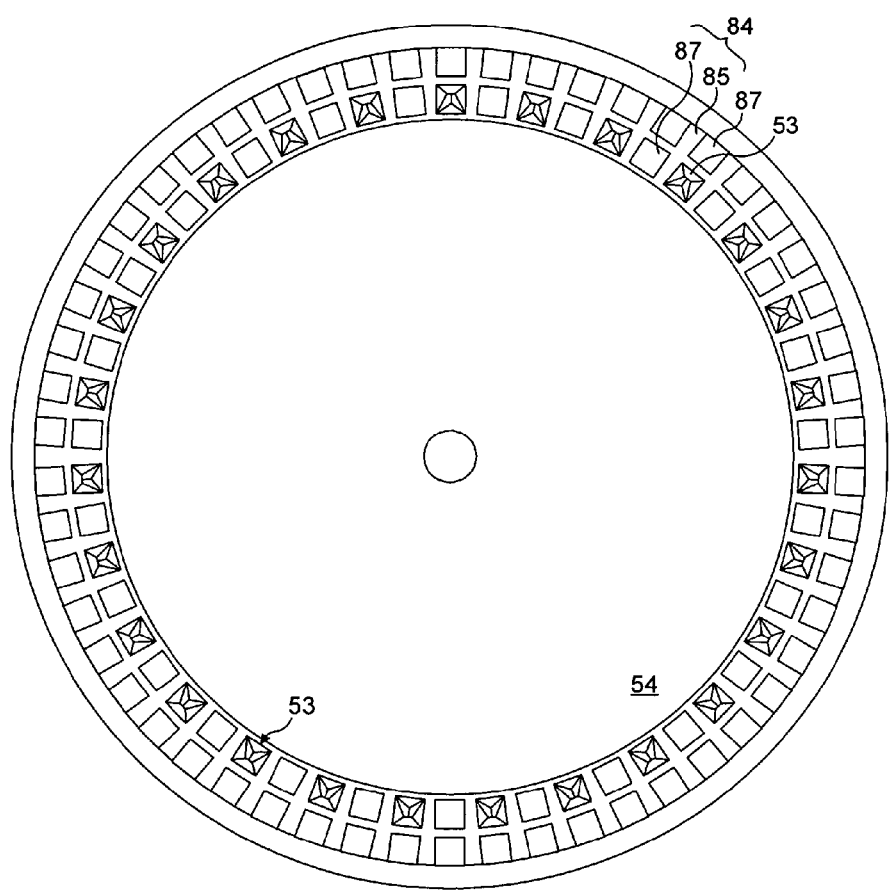
FIG. 9 is bottom view of the rotary part of the beverage production device of FIGS. 7 and 8.

As illustrated in FIGS. 9 and 10, the lower surface 54 of the cover part 49 comprises a series of perforating elements or projections 53 as previously described being distributed in a circular pattern in a peripheral region of the surface. Each perforating element 53 will produce a perforation in the upper membrane of the capsule and therefore a passage for the centrifuged liquid for leaving the capsule engaged in rotation. The number of perforating elements can be changed by removing the cover plate and replacing it by a plate having a higher number of perforating elements. Preferably, the surface can comprise channelling means 84 formed by a series of channels 85 provided in the surface 54 in order to ensure that a controlled flow gap remains between the membrane and the cover part between the perforating elements and the valve means. The channels 85 can be formed by relief elements 87 forming a distancing means. For instance, a series of relief elements 87 can be provided between the perforating elements to ensure that the membrane does not collapse between the perforating elements which would so cause the blockage of the liquid flow. Furthermore, another series of relief elements 87 can be placed in the flow path between the perforating elements 53 and the valve means to further ensure the presence of channels between the surface 54 and the flange-like rim 4 of the capsule so that the flow of liquid is properly channelled towards the valve means. It should be noticed that the distancing means, i.e., a series of discrete relief elements, for maintaining a flow gap could be formed onto the flange-like rim of the capsule. For instance, the flange like-rim can comprise a series of small concentrically-arranged projections distributed inwardly relative to the ring-shaped projection.

In another mode of the invention, the annular projection 81 on the surface of the capsule is formed by an element which is made of a material which is different from the material of the flange-like rim. The element can be made of a resilient or non-resilient material. In particular, the element can be made of plastic or can be a rubber O-ring which is sealed onto the flange-like rim. The ring can, for instance, be sealed by heating or ultrasounds or deposited as a liquid, e.g., liquid silicone rubber (LSR), and allowed to harden onto the rim. The projecting element 81 may also be associated by other means to the capsule such as by an adhesive or by clipping into an annular groove of the capsule.

Figure 11:
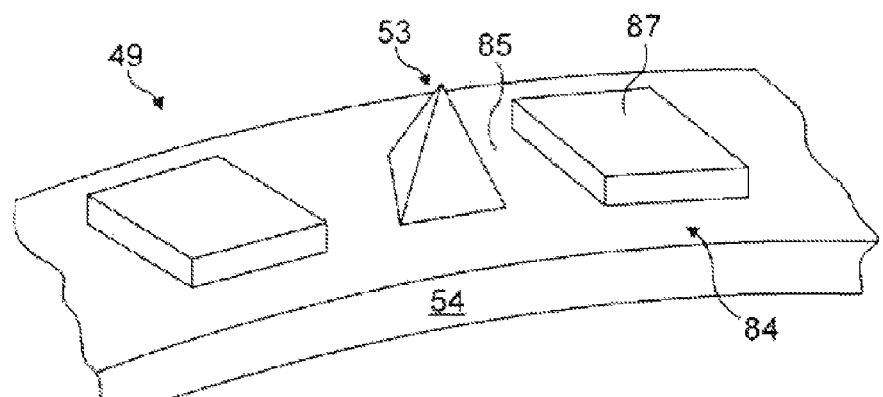
FIG. 11 is a possible variant of the cover part of the device showing a different design of the perforating elements.
Figure 12:
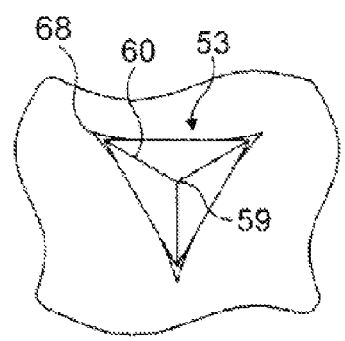
FIG. 12 illustrates the perforation of the membrane by the perforating element of FIG. 11.

FIGS. 11 and 12 shows a variant of the invention in which the lower surface 54 of the cover part 49 comprises pyramidal projections 53 forming the perforating elements. As in the previous embodiment, channelling means are provided with distancing elements 87 smaller than projections 53 and channels 85 formed between the projections 53 and the distancing elements 87. The distancing element have a relatively flat upper surface for maintaining the membrane at a distance from the bottom surface 54 and therefore for preventing the membrane from hindering the flow of beverage.

Each projection 53 comprises, for instance, three or more cutting surfaces joining at an apex 59. Hence, several edge lines 60 are provided for demarcating the cutting surfaces. When the membrane is perforated by the element 53, one can notice that tearing areas 68 of the membrane are created thus forming orifices for the beverage flow coming out of the capsule. The membrane can be chosen to ensure the best repeatability for the orifices' size. In particular, aluminium membranes have chosen remarkable results although polymeric membranes are not excluded from the scope of the invention.

Figure 13:
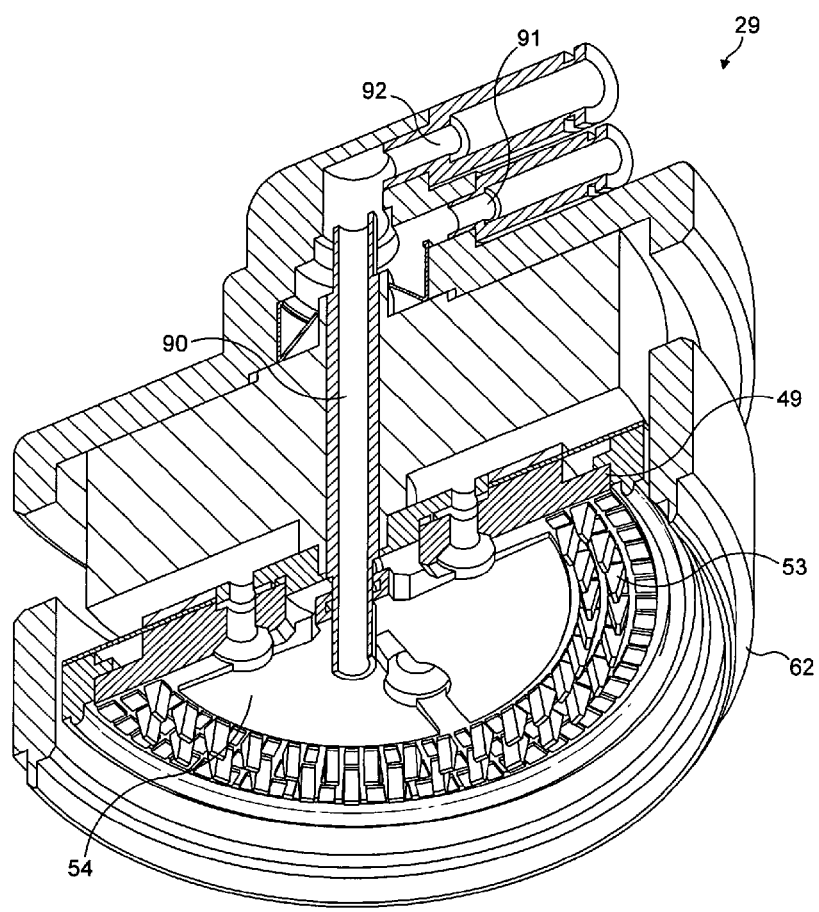
FIG. 13 illustrates a rotary part of the beverage production device according to a second variant showing another design of the perforating elements.
Figure 14:
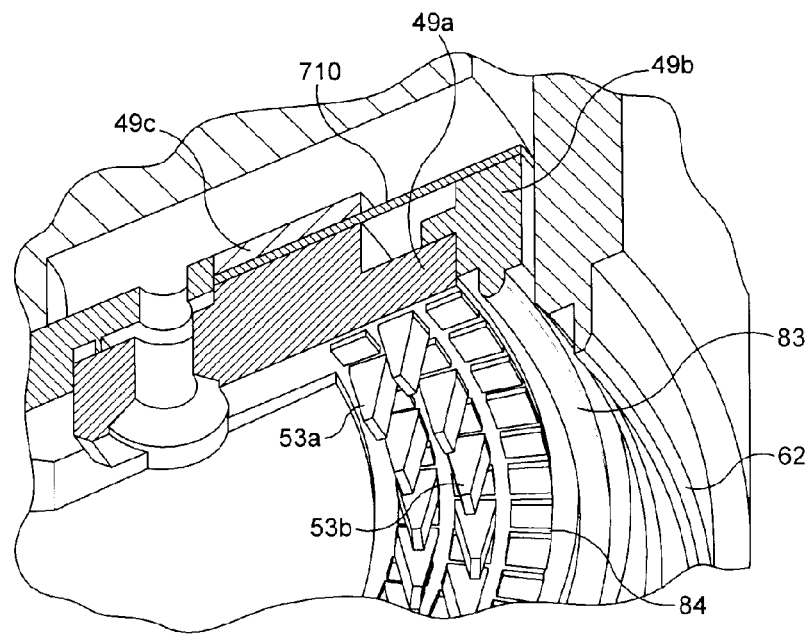
FIG. 14 illustrates a detailed view of the part of FIG. 13.
Figure 15:
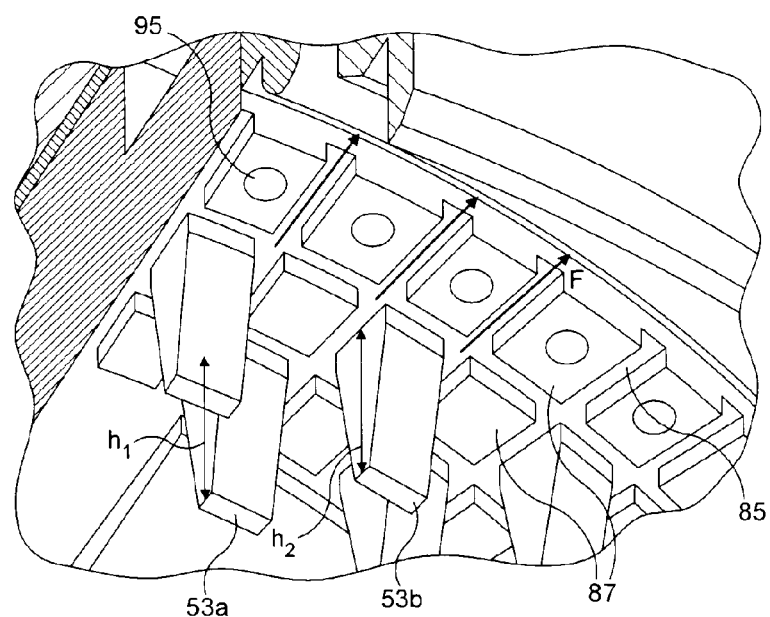
FIG. 15 illustrates an enlarged view of FIG. 14.

Another possible mode of the device of the invention is illustrated in FIGS. 13 to 15. The liquid food preparation device comprises a water injection head 29 for injecting water in the capsule and a capsule holder (as previously illustrated) for holding the capsule in the device. For simplification, the same reference numbers have been used to indicate the same or equivalent technical means as illustrated in the previous modes. The head can comprise a water injection conduit 92 for feeding the needle 90 with hot or cold water and a gas venting conduit 91 for allowing gas to escape the capsule as water fills the capsule.

In the present mode, the cover part 49 is formed of an first innermost injection and perforation part 49a and an outermost valve part 49b. The valve part is capable of moving relative to the injection and perforation part 49a to close against the capsule's rim (not shown) by pressure contact with annular ring 83. The ring may be configured with different profiles such as convex, concave, flat, etc. A spring biasing element 710 can be placed to provide resilience to the valve portion when placed in engagement against the capsule's rim. The element 710 can be inserted fixedly between part 49a and an upper part 49c of the head. When the head is engaged against the top of the capsule, the valve portion is pushed backwards and forces the element 710 to flex thereby creating a backpressure on the valve means of the system that is dependent on the force of the spring biasing element.

The innermost injection part 49a comprises perforating means 53 formed of an innermost array of perforating members 53a and a outermost array of perforating members 53b. The innermost perforating members 53a have a greater height h1 than the outermost perforating members 53b thereby allowing a more gradual perforation of the membrane 3 of the capsule when the head is closed onto the capsule. Therefore, the closure force can be advantageously reduced. As an additional beneficial result, a larger number of perforation members can be designed which provides the following advantages:
- the size of the perforated orifices can be decreased by designing thinner perforating member which so provides a more effective filtering of the centrifuged liquid with less solid residues possibly leaking out of the capsule both during perforation and after removal of the perforating members,
- the flow rate can be increased as compared to fewer perforating members.

The shape of the perforation members 53a, 53b can be truncated pyramids as illustrated or truncated cones (not shown). The perforating members can also have a polygonal base such as pentagonal, hexagonal or octagonal. The perforating member may also have a cruciform perforating shape.

As in the previous embodiments, the surface 54 of the cover part 49 comprises channels means 84 formed by a series of channels 85 between relief elements 87 to facilitate guidance of the centrifuged flow "f" out of the system in direction of the impact wall, the tubular portion of skirt 62 (FIG. 15). The relief elements 87 preferably comprise a flat lower surface which presses, e.g., at location 95, onto the portion of capsule's rim, e.g., at its sealing portion, to held the capsule firmly in place when the valve means opens, i.e., the annular ring 83 is pushed upwards by the pressure of centrifuged liquid flow "f" coming out of the capsule.

It should also be noted that the perforating members could be retracted during opening of the injection head for preventing a possible contact with the user when the injection head is in open position before insertion of the capsule.

What is claimed is:

1. A system for preparing a liquid food from a food susbtance by passing water through the substance in a capsule, the system comprising:
   a capsule comprising a perforable delivery membrane;
   a device for removably receiving the capsule, the device including a capsule holder for holding the capsule in the device, and a water injection head for injecting water into the capsule through the delivery membrane;
   means for driving the capsule in centrifugation;
   a rotary cover plate; and
   perforating means comprising a plurality of perforating members having membrane engaging sections configured relative to the capsule in the device to open outlets at the periphery of the capsule with the perforating members designed as projections having a wider cross section with at least one concave line in transversal cut view of the section to impart holes into the membrane that are of larger cross-section than the membrane engaging sections of the perforating members;
   a flow restriction valve placed downstream of the perforating means arranged to open as a result of the pressure exerted by the centrifuged liquid thereon;
   wherein the perforating means extend from the surface of the rotary cover plate in the capsule when the capsule is inserted in the device and when engaged in perforation through the membrane forms filtering means comprising orifices in the membrane, the filtering means formed between the perforating members and the membrane adjacent to the perforating members, and having a particle retention size and a particle retention shape that cooperate to retain solid particles of the food substance in the capsule while allowing the centrifuged liquid to leave the capsule through the orifices; and,
   wherein the perforating means further comprises channels between the perforating members and a series of relief elements between the perforating elements to ensure that the membrane does not collapse between the perforating members, thereby preventing blockage of the liquid flow during use and ensuring the flow of liquid is channelled towards the valve means.

2. The system according to claim 1, wherein the capsule does not contain a separate filter element therein other than the filtering means having the recited particle retention size and particle retention shape that retain solid particles of the food substance in the capsule.

3. The system according to claim 1, wherein each projection has a section that sharpens progressively from a larger base to at least one or more perforating tips and each projection comprises at least two cutting surfaces delimited by at least one edge line.

4. The system according to claim 1, wherein the device comprises at least ten projections which are distributed across a peripheral region of the membrane of the capsule.

5. The system according to claim 1, wherein the perforating means comprises projections each having a section that sharpens progressively from a larger base to a perforating tip for forming the orifices as individual perforations in the membrane, with each perforation having a cross-section that is larger than the cross-section of the base of the associated projection when the projections are engaged in perforation with the membrane.

6. The system according to claim 1, wherein each individual perforating projection has substantially triangular or trapezoidal cutting surfaces.

7. The system according to claim 1, wherein the flow restriction valve comprises an annular closing ring.

8. The system according to claim 7, wherein the annular ring is formed on the rotary cover plate.

9. The system according to claim 7, wherein the annular closing ring is formed on the capsule.

10. The system according to claim 1, wherein the perforating means comprises perforating members of different heights that are configured relative to the capsule in the device to open outlets at the periphery of the capsule.

11. The system according to claim 10, wherein the perforating means comprises a first array of first perforating members of one height and a second array of second perforating members of different height that are offset relative to each other in a radial direction.

12. The system according to claim 11, wherein the first and second arrays of perforating members protrude from an upper surface of a periphery of a rotary part of the injection head.

13. The system according to claim 12, wherein the rotary part includes a first innermost part and a second outermost part, wherein the innermost part comprises the first and second arrays of perforating members and the outermost part comprises an annular spring-biased closing ring.

14. A system for preparing a liquid food from a food substance by passing water through the substance by passing water through the substance in a capsule, the system comprising:
- a sealed capsule having a perforable delivery membrane;
- a device for removably receiving the capsule, the device including a capsule holder for holding the capsule in the device, and a water injection head for injecting water into the capsule through the delivery membrane;
- means for driving the capsule in centrifugation;
- a rotary cover plate, and
- perforating means comprising a plurality of perforating members having membrane engaging sections configured relative to the capsule in the device to open outlets at the periphery of the capsule, with the perforating members designed as projections comprising a wider cross section with at least one concave line in transversal cut view of the section to impart holes into the membrane that are of larger cross-section than the membrane engaging sections of the perforating members;
- a flow restriction valve placed downstream of the perforating means arranged to open as a result of the pressure exerted by the centrifuged liquid thereon;
- wherein the perforating means extend from the surface of the rotary cover plate in the capsule when the capsule is inserted in the device and has channelling means comprising channels between the perforating members and distancing means comprising a series of relief elements between the perforating elements to ensure that the membrane does not collapse between the perforating members, thereby preventing blockage of the liquid flow during use and ensuring that the flow of liquid is channelled towards the valve means, and the membrane engaging sections of the perforating members when engaged in perforation through the membrane forms filtering means comprises orifices in the membrane, formed between the perforating members and the membrane adjacent to the perforating members, having a particle retention size and a particle retention shape that allow gas to escape from the capsule while retaining solid particles of the food substance in the capsule and assuring that the centrifuged liquid leaves the capsule through the orifices.

15. The system according to claim 10, wherein the membrane engaging section of the perforating members comprises truncated cones or pyramids.

16. A device for preparing a liquid food from a food substance by passing water through the substance by passing water through the substance in a sealed capsule comprising a perforable delivery membrane; the device being configured for removably receiving the capsule, the device comprising:
- a capsule holder for holding the capsule in the device,
- a water injection head for injecting water into the capsule through the delivery membrane comprising a rotary cover plate;
- means for driving the capsule in centrifugation;
- perforating means extending from the surface of the rotary cover plate and comprising a plurality of perforating members having membrane engaging sections arranged to open outlets at the periphery of the capsule, with the perforating members designed as projections having a wider cross section with at least one concave line in transversal cut view of the section to impart holes into the membrane that are of larger cross-section than the membrane engaging sections of the perforating members;
- a flow restriction valve placed downstream of the perforating means arranged to open as a result of the pressure exerted by the centrifuged liquid thereon;
- wherein the perforating means further comprises channelling means comprising channels between the perforating members and distancing means comprising a series of relief elements between the perforating elements to ensure that the membrane does not collapse between the perforating members, thereby preventing blockage of the liquid flow during use and ensuring that the flow of liquid is channelled towards the valve means, and
- wherein the membrane engaging sections of the perforating members when engaged in perforation through the membrane forms filtering means comprises orifices in the membrane, formed between the perforating members and the membrane adjacent to the perforating members, having a particle retention size and a particle retention shape that allow gas to escape from the capsule while retaining solid particles of the food substance in the capsule and assuring that the centrifuged liquid leaves the capsule through the orifices.

* * * * *